US009061784B2

(12) United States Patent
Korthäuer

(10) Patent No.: US 9,061,784 B2
(45) Date of Patent: Jun. 23, 2015

(54) DEVICE FOR TWO-SIDED OR MULTI-SIDED LABELING

(75) Inventor: Manfred Korthäuer, Mulheim/Ruhr (DE)

(73) Assignee: Espera-Werke GmbH, Duisburg (DE)

( * ) Notice: Subject to any disclaimer, the term of this patent is extended or adjusted under 35 U.S.C. 154(b) by 249 days.

(21) Appl. No.: 13/392,659

(22) PCT Filed: Aug. 11, 2010

(86) PCT No.: PCT/EP2010/061660

§ 371 (c)(1),
(2), (4) Date: May 7, 2012

(87) PCT Pub. No.: WO2011/023538

PCT Pub. Date: Mar. 3, 2011

(65) Prior Publication Data

US 2012/0216956 A1 Aug. 30, 2012

(30) Foreign Application Priority Data

Aug. 28, 2009 (DE) ........................ 10 2009 039 000

(51) Int. Cl.

| | |
|---|---|
| ***B29C 65/48*** | (2006.01) |
| ***B32B 37/26*** | (2006.01) |
| ***B32B 38/14*** | (2006.01) |
| ***B32B 41/00*** | (2006.01) |
| ***B32B 43/00*** | (2006.01) |
| ***B65C 9/18*** | (2006.01) |
| ***B65C 9/36*** | (2006.01) |
| ***B65C 1/04*** | (2006.01) |
| ***B65C 9/28*** | (2006.01) |

(52) U.S. Cl.
CPC ............... *B65C 1/045* (2013.01); *Y10T 156/17* (2015.01); *B65C 9/28* (2013.01); *B65C 9/36* (2013.01)

(58) Field of Classification Search
USPC ....... 156/538, 540–542, 556, DIG. 3, DIG. 4, 156/DIG. 42, DIG. 44; 53/136.1, 136.3, 53/136.4, 329
See application file for complete search history.

(56) References Cited

U.S. PATENT DOCUMENTS 3,929,026 A * 12/1975 Hofmann ...................... 198/847
4,121,404 A 10/1978 Davis
4,384,272 A 5/1983 Tanaka et al.

(Continued)

FOREIGN PATENT DOCUMENTS

CA 1007604 3/1977
CN 2245583 Y 1/1997

(Continued)

*Primary Examiner* — Sing P Chan
(74) *Attorney, Agent, or Firm* — The Webb Law Firm

(57) ABSTRACT

A device for two-sided or multi-sided application self-adhesive labels to a three-dimensional object, which has a protrusion defining a fillet, including a transport or support surface supporting the object, at least one applicator means, by which the label can be applied to the protrusion of the object, and at least one pressing means, including a pressing body or a compressed air nozzle, for smoothing the label onto the fillet. The pressing body or the compressed air nozzle is mounted on a transmission, coupled to a drive by which the pressing body or the compressed air nozzle can be displaced back and forth from an initial position, at a vertical distance from the transport or support surface, to an operating position, in which the pressing body or the compressed air nozzle is arranged in the operating position, at least in part below the protrusion.

17 Claims, 5 Drawing Sheets

(56) References Cited

U.S. PATENT DOCUMENTS

| | | | | | |
|---|---|---|---|---|---|
| 4,490,961 | A | * | 1/1985 | Raque | 53/329.4 |
| 4,668,327 | A | | 5/1987 | Voltmer et al. | |
| 5,684,275 | A | | 11/1997 | Tolson | |
| 6,155,322 | A | | 12/2000 | Landan et al. | |

FOREIGN PATENT DOCUMENTS

| | | | |
|---|---|---|---|
| DE | 2901702 | | 7/1979 |
| DE | 3909373 | A1 | 9/1990 |
| DE | 10256112 | A1 | 6/2004 |
| ES | 502461 | | 5/1981 |
| GB | 2022050 | | 12/1979 |
| GB | 2288588 | A | 10/1995 |
| GB | 2311507 | A | 10/1997 |
| JP | 52006500 | A | 1/1977 |
| JP | 56052773 | A | 5/1981 |
| JP | 62194520 | U | 12/1987 |
| JP | 2002154509 | A | 5/2002 |

* cited by examiner

DEVICE FOR TWO-SIDED OR MULTI-SIDED LABELING

BACKGROUND OF THE INVENTION

1. Field of the Invention

The invention relates to a device for two-sided or multi-sided application of at least one self-adhesive label to a three-dimensional object, which has a protrusion defining a fillet, in particular in the form of a web-shaped rim, comprising a transport or support surface supporting the object to be labelled, at least one applicator means, by means of which the label can be applied to the protrusion of the object, and at least one pressing means, comprising a pressing body or a compressed air nozzle, for smoothing the label onto the fillet of the object.

2. Description of Related Art

Nowadays, foods in particular are often packaged in plastics material or aluminium trays, which have a peripheral web-shaped rim or flange which serves as an adhesion or joining surface for a sealing foil which is to be glued or welded thereto or provides positive fitting of a lid. The plastics material or aluminium trays used in this context are often of a substantially rectangular shape having longitudinal sides and shorter transverse sides. Substantially rectangular packaging trays of this type make it possible to use space efficiently when arranging similar trays in containers, for example in a refrigerator. However, packaging trays of other shapes are also common, for example circular, oval or triangular trays, and may also have a peripheral web-shaped rim or flange for applying a sealing foil or a lid.

Packagings of this type, in particular food packagings, are often labelled on two or more sides, a single label being glued to the sealing foil or lid on the upper side, the front wall, the underside and optionally also the rear wall of the packaging tray, in such a way that the applied label extends over the externally projecting web-shaped rim. Conventionally, the label applied in this manner is not positioned parallel to the contour of the packaging, but spans the fillet, which is located between the outer edge of the web-shaped rim and the front wall of the container, with spacing (see FIG. 9).

In practice, it has been found that labels applied on two or more sides are often torn or ripped in the region of the fillet of packagings of this type. The label may in particular be torn or ripped during the assembly and/or transport of a plurality of packagings of this type in external packagings, if the web-shaped rim of one packaging presses or impacts under the web-shaped rim of a corresponding adjacent packaging and against the label which is stretched over the fillet of said corresponding adjacent packaging with spacing. A torn or ripped label does not merely give the packaging an unpleasant appearance; sometimes, the damage to the label also means that it is no longer easily possible to read a barcode printed on the label, and so the relevant product cannot be reliably identified using a scanner, for example at a till. Moreover, labels applied on two or more sides often also have a sealing and guarantee function; in this context they may be referred to as sealing or guarantee labels. If a label of this type is ripped or torn, the customer will assume that the packaging may already have been opened, and that the quality and/or quantity of the contents may no longer be as it should.

U.S. Pat. No. 6,155,322 discloses a labelling device with which self-adhesive labels can be applied to packagings having a flange which defines a lower fillet and an upper fillet. The device comprises two telescopically formed push rods, arranged above and below a belt conveyor, which transports the packagings. Each push rod is provided, at the free end thereof, with a tamping head, which is used to smooth the respective label onto the lower or upper fillet. The operation of the push rod which smoothes the label onto the lower fillet requires a longitudinal division of the belt conveyer into two separate belts, separated transverse to the transport direction, in such a way that the push rod can be moved through between the belts.

The object of the present invention is to provide a device for two-sided or multi-sided labelling of objects which each have a web-shaped rim defining a fillet or the like, said device resolving the above-described problem where the label tears or rips in the region of the fillet, and also being usable in combination with conventional conveyor belts, i.e. conveyor belts which are not divided in two.

This object is achieved by a device having the features of claim 1.

SUMMARY OF THE INVENTION

The device according to the invention is characterised in that the pressing body or the compressed air nozzle is mounted on a transmission, which is coupled to a drive and by means of which the pressing body or the compressed air nozzle can be displaced back and forth from an initial position, at a vertical distance from the transport or support surface, to an operating position, in which the pressing body or the compressed air nozzle is arranged in the operating position, at least in part below the protrusion defining the fillet.

The pressing means according to the invention provides that the label, which is to be applied transversely over the projecting rim of the object on two or more sides, is positioned on the fillet so as to follow the contour of the object substantially tightly after application. In particular, with the pressing means according to the invention the label can be applied to the underside of the projecting rim. The label is applied to the fillet of the object substantially parallel to the contour thereof by the pressing means according to the invention, and because said label is in tight contact along the fillet, it can no longer be or can no longer easily be damaged if it is subjected to impact or pressure in this location. For example, damage to a barcode printed in this location is thus largely excluded. Equally, this improves a sealing or guarantee function of the label. In addition, the pressing means according to the invention makes it possible to increase the laterally applied label length, in such a way that, if required, more information and/or larger and thus more readable letters, numbers and symbols can be arranged on the side of the object by means of the label. This is particularly advantageous for stacked packagings.

Moreover, the device according to the invention can be implemented using conventional conveyor belts. Longitudinal division of the conveyor belt, as provided by the device known from U.S. Pat. No. 6,155,322, is not necessary in the device according to the invention.

Simultaneously with the movement of the transmission, the pressing body which is mounted on the transmission is moved from the initial position (idle position) to the operating position for smoothing the label onto the fillet. In the device according to the invention, (additional) movement of the pressing body relative to the transmission is not necessary for smoothing the label onto the fillet of the object to be labelled.

The pressing means of the device according to the invention can be integrated into an existing labelling device in a relatively simple manner, it being possible by way of the transmission to provide precise guidance, adapted to the object to be labelled, of a pressing body or compressed air nozzle. In particular, the pressing means can thus be mounted in a relatively simple manner alongside a movement path along which the object to be labelled is moved, the pressing means being remote from the movement path when in the initial or idle position thereof and engaging with the movement path when in the operating position thereof.

The transmission of the pressing means is preferably in the form of a many-membered articulated transmission. A transmission of this type can be provided in a relatively compact construction, and makes possible rapid movement of the pressing means, or a pressing body fixed thereto, from the initial position (idle position) to the operating position and back, in such a way that overall a relatively high labelling performance can be achieved.

In a further advantageous configuration of the invention, the pressing body contacts the object to be labelled while the label is smoothed on, the transmission guiding the pressing body in the movement from the initial position (idle position) to the operating position and back, orientated parallel to a substantially planar transport or support surface which carries the object to be labelled. In this configuration, the pressing means can be made particularly compact. Moreover, this configuration leads to constructional and functional advantages as regards a combination of the pressing means with an adjustment means, by means of which the height or position of the engagement point of the pressing means relative to the object to be labelled can be adjusted. Adjusting the height or position of the engagement point makes it possible to adapt the pressing means to packagings of different heights or different vertical positions of the web-shaped rim in different packagings; this adjustment can be carried out in a relatively simple manner with parallel guidance of the pressing body as in the present case, and a good prediction of the result of the height or position adjustment is possible in each case.

As an alternative to this parallel guidance, the pressing means may also be provided with a transmission which guides the pressing body along a curved, in particular arced path in the movement from the initial or idle position to the operating position and back. A transmission of this type can occasionally be produced more cost-effectively than a transmission which guides the pressing body in a parallel manner.

A further advantageous configuration of the invention provides that the pressing means is equipped with various mutually exchangeable pressing bodies, of which the respective pressing body in the mounted state contacts the object to be labelled while the label is smoothed on, and/or is provided with various mutually exchangeable transmission elements. By exchanging the pressing body and/or one or more transmission elements, the engagement point of the pressing means can be adjusted, and thus adapted to different positions and/or shapes of the projecting rim of the object to be labelled.

As an alternative or in addition to a pressing body which contacts the object to be labelled while the label is smoothed on, the pressing means can also be provided with at least one compressed air nozzle for contact-free smoothing of the label. The contact-free smoothing of the label onto the fillet of the object may be particularly advantageous for mechanically sensitive labels or products.

To provide that the longitudinal axis of a rectangular or elongate label extends parallel to the longitudinal or transverse sides of the labelled object after application thereof, the device according to the invention preferably comprises at least one alignment means, comprising at least one guide which aligns an elongate protrusion, defining the fillet, of the object to be labelled parallel to an elongate working edge, which smooths the label onto the fillet, of the pressing body. This guide reliably aligns the object to be labelled parallel to the label to be applied and parallel to the pressing body which smooths the label onto the fillet or to the working region of the pressing means. Advantageously, the guide may in this case be formed from conveyors, preferably continuous conveyors, which are provided with at least one drive. The continuous conveyors may in particular be roller conveyors comprising one or more driven rollers.

A further embodiment of the invention provides that the height of the guide or the conveyor is adjustable relative to a transport or support surface carrying the object to be labelled. In this way, the guide or the conveyor can be adapted in a simple manner to objects which are to be labelled at different heights, in particular to different height positions of peripheral web-shaped rims of the objects.

So as to be able, if desired, to label objects of different widths in the stated manner in the device according to the invention, a further configuration of the invention provides that the alignment means comprises at least two conveyor belts or roller conveyors, which extend mutually parallel, define a transport path for the object to be labelled, and can be displaced towards and away from one another.

It is further provided that at least one of the belts, or the rollers of at least one of the roller conveyors, is/are formed in a plurality of layers, and comprise(s) a relatively thick entrainment layer, which is made of flexible foam or a material having resilient restoration properties and faces towards the transport path. The flexible, resilient entrainment layer provides sufficiently strong frictional engagement between the belt or rollers and the object to be labelled, in such a way that the object is reliably held in place when the pressing means is guided against the object to smooth on the label. In addition, the flexible, relatively thick entrainment layer of the respective belt or rollers allows for conventional measurement tolerances of the object to be labelled, in such a way that the object can, in spite of the measurement tolerances thereof, be guided reliably to the pressing means without any adjustment of the spacing of the conveyor belts or roller conveyors which extend mutually parallel. Alternatively or in addition, at least one of the belts or at least one of the roller conveyors may be mounted resiliently, in such a way that resilient expansion of the transport path defined by the belts or rollers is possible, within limits, without adjusting the spacing of the belt conveyors or roller conveyors which extend mutually parallel.

A further preferred configuration of the invention is characterised in that the pressing means can be deactivated, in such a way that it is also possible to apply self-adhesive labels using the applicator means without the effect of the pressing means. The pressing means can thus be switched on or off as required. When the pressing means is deactivated, it is also possible by means of the device according to the invention to label cuboid objects, in particular packagings, which do not have a projecting rim and thus do not have a fillet. Thus, in this configuration, the device according to the invention can also be used flexibly for other labelling tasks.

According to a further configuration of the invention, the device according to the invention may also comprise a plurality of pressing means of the specified type, with which the label or a plurality of labels can be smoothed onto the fillet or a plurality of these fillets of the object to be labelled. This configuration makes it possible, for example, to apply pasted labels (banderoles) transversely over a peripheral web-shaped rim of the object in a contour-parallel manner. The at least two pressing means for smoothing the label onto the at least one fillet of the object may in this context engage on opposite sides of the object.

The smoothing of the label onto a fillet of an object to be labelled can be controlled in various manners. One configuration of the device according to the invention provides a control means, by means of which a conveyor for transporting the object to be labelled can be controlled in such a way that the object is moved by the conveyor against the pressing body, located in the operating position, to smooth the label onto the fillet of the object. According to another configuration, the device according to the invention comprises a control means, which can control a drive, which moves the pressing means, and control a conveyor for transporting the object to be labelled, in such a way that the conveyor fixes the object in an application position and the pressing body is moved against the object to smooth the label onto the fillet of the object. Whilst in one configuration the object to be labelled is moved against the pressing body, in the last-mentioned configuration the pressing body is moved against the stationary or fixed object. A combination of these two options is also within the scope of the present invention. For this purpose, the device preferably comprises a control means, which can control a drive, which moves the pressing means, and control a conveyor for transporting the object to be labelled, in such a way that the conveyor moves the object along an application region and the pressing body for smoothing the label onto the fillet of the object moved along the application region is moved against the object, in such a way that the label is smoothed onto the fillet while the object is moving and while the pressing means is moving.

In a further configuration of the invention, the control means is provided with a data input means and/or a data interface, via which data regarding the dimensions and/or constitution of the object to be labelled, in particular the position of the elongate protrusion, and/or data regarding the constitution of the label to be applied can be inputted into a data storage unit. The control means provided in this manner thus controls the pressing means and/or the conveyor, in particular the drive thereof and/or the adjustment means thereof, as a function of the inputted data. This configuration makes it possible to adjust and select various parameters. In particular, in this way the position of the label can be selected and adjusted. In addition, the thickness of the label and/or the stability and the contents of a packaging tray to be labelled can be taken into account by inputting corresponding data into the data storage unit associated with the control means. This configuration of the device according to the invention provides automatic control and monitoring of the position of the label and the strength of the contact, and this is advantageous for example in relation to soft and/or sensitive packagings. Alternatively, however, all of the adjustments on the device according to the invention can be carried out by hand.

Further preferred and advantageous configurations of the device according to the invention are given in the dependent claims. Further advantageous configurations of the device according to the invention comprise in particular one or more members which press or blow the label, without folds, onto the upper side and/or underside of the object to be labelled. These members are preferably brushes, rollers and/or blow nozzles.

BRIEF DESCRIPTION OF THE DRAWINGS

In the following, the invention is described in greater detail by way of several embodiments. In the schematic drawings.

DESCRIPTION OF THE PREFERRED EMBODIMENTS

Figure 1:
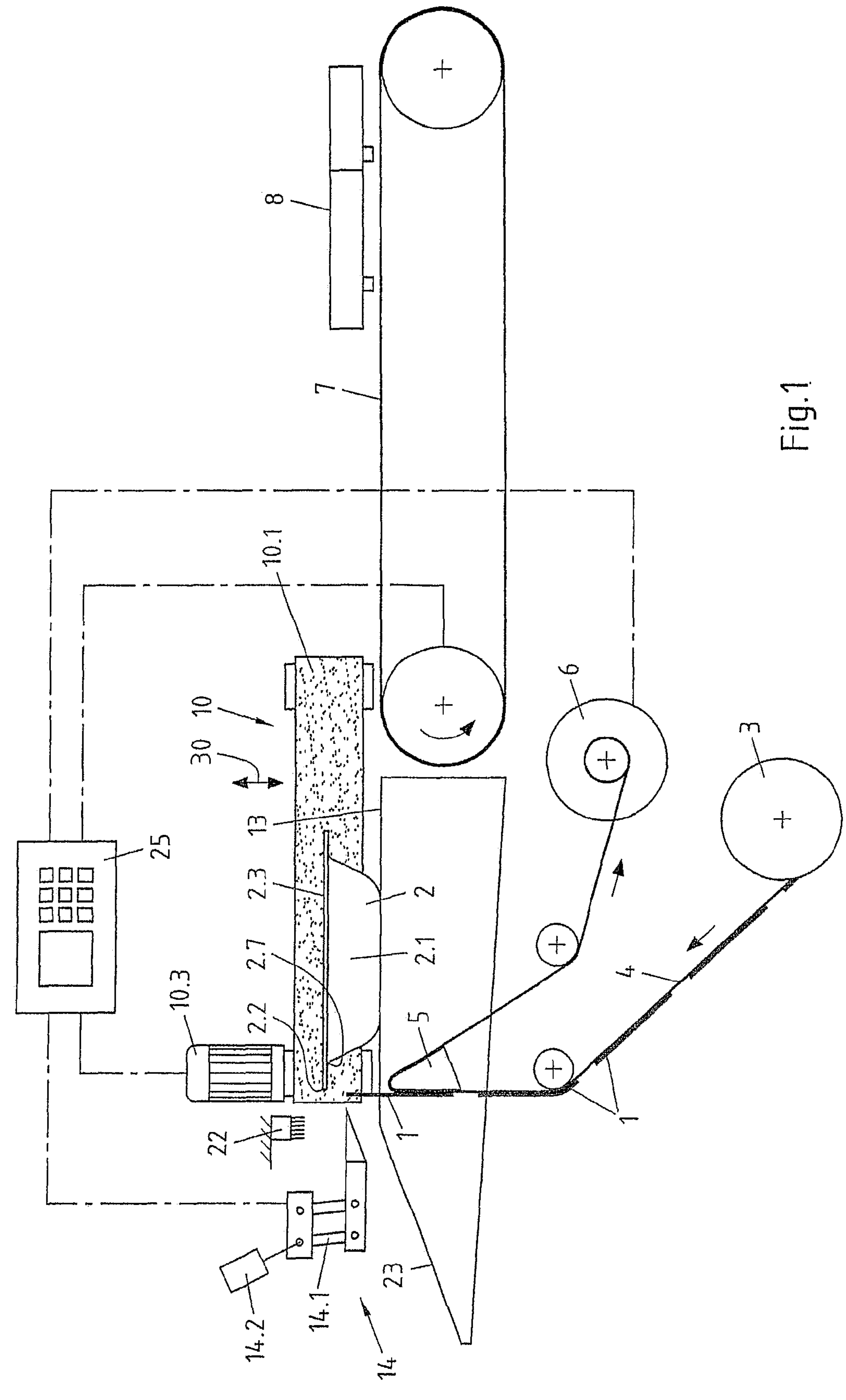
FIG. 1 is a longitudinal sectional side view of a device according to the invention.
Figure 2:
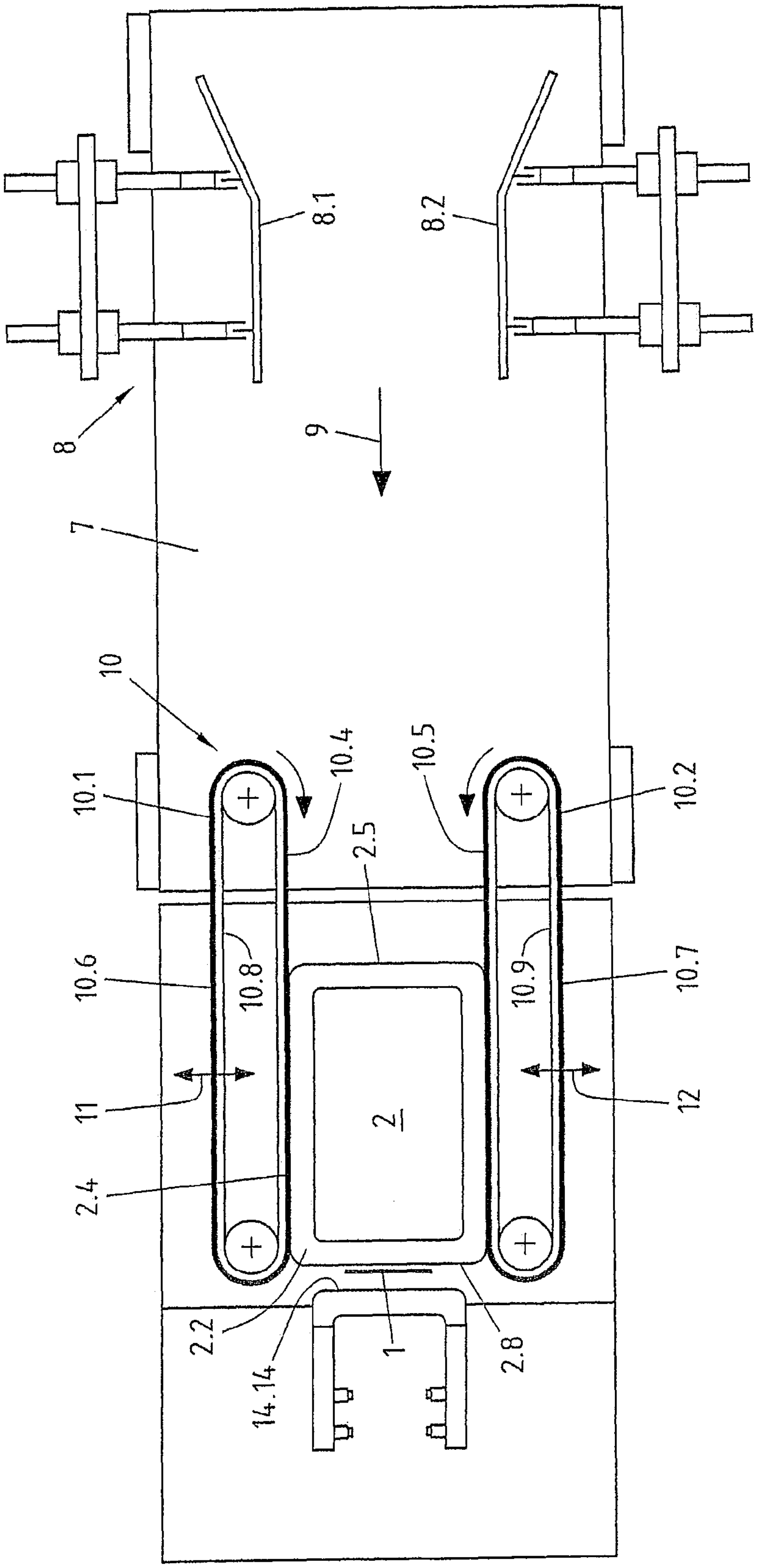
FIG. 2 is a plan view of the device of FIG. 1.

FIGS. 1 and 2 schematically show a device for two-sided or multi-sided application of a self-adhesive label 1 to a three-dimensional object 2. The object 2 to be labelled is a packaging, for example a packaging containing a food. The packaging 2 consists of a tray 2.1, which comprises an elongate protrusion 2.2 in the form of a web-shaped rim or flange, on the upper side of which a sealing or cover foil 2.3 is sealed or glued (see FIGS. 4 to 7). Instead of a flat or planar foil 2.3, a three-dimensional lid may also be in a material or positive fit with the rim 2.2 of the tray 2.1 (see FIG. 8). The tray 2.1 or the projecting rim 2.2 thereof is substantially rectangular in form. The rim 2.2 has longitudinal sides 2.4 extending mutually parallel and transverse sides 2.5 extending substantially perpendicular thereto. The protrusion or rim 2.2 of the tray 2.1 forms a fillet 2.7 together with the peripheral wall 2.6 thereof.

The device shown in FIGS. 1 and 2 further comprises an application means, with which a label 1, preferably an elongate or strip-shaped label 1, can be applied to the packaging 2 over the rim 2.2 of the tray. The applied label 1 extends over and transverse to the rim 2.2. The label 1 may for example be a paper label, plastics material label or transparent plastics material label. The label 1 may comprise printing, in particular coloured printing, or if desired can still be printed after being applied to the packaging 2. The application means is associated with a label introduction means, which in the embodiment shown comprises a mounting for rotatably receiving a supply reel 3, on which a carrier strip 4 with a plurality of labels 1 adhering thereto is wound.

The label 1 to be applied may also come from a continuous paper which is coated with an adhesive and which is cut to length with a paper cutting means, or from continuous paper which is cut to particular dimensions and provided with adhesive.

The carrier strip 4 is guided from the supply reel 3, over deflection rollers or deflection shafts and a dispensing edge 5 arranged in between, to a wind-up reel 6, which is driven intermittently by a discontinuously activated motor (not shown). The relatively sharp deflection at the dispensing edge 5 causes the label 1 adhering to the carrier strip 4 at that point to be released. The label 1 is thus guided and positioned transverse to a movement path, which may be pre-specified, of the packaging 2.

The packaging 2 to be labelled is transported by means of a conveyor 7, which is preferably in the form of a belt conveyor. An alignment means 8 is arranged above the conveyor 7 and provides approximate alignment of the packaging 2, in such a way that the substantially linear longitudinal sides 2.4 of the tray rim 2.2, or the transverse sides 2.5 extending perpendicular thereto in the case of transversely transported packagings, are aligned parallel or virtually parallel to the conveying direction 9 or longitudinal axis of the conveyor 7. For this purpose, the alignment means 8 comprises two angled guide rails 8.1, 8.2, which define a conically narrowing intake region. The horizontal distance between the guide rails 8.1, 8.2 can be set variably.

A further guide 10 for the packaging 2 to be labelled is provided downstream from the guide rails 8.1, 8.2 in the conveying direction 9, and provides fine alignment of the packaging 2, in such a way that the front, substantially linear edge 2.8 of the web-shaped rim 2.2 of the packaging 2 is aligned parallel to the plane which defines the label 1 positioned in the movement path of the packaging 2. The label 1 to be applied and the linear front edge 2.8 of the packaging 2 are thus aligned mutually parallel. This provides that the longitudinal axis or axis of symmetry of the applied label 1 extends parallel to the longitudinal side 2.4, or in the case of transversely transported packagings 2 parallel to the transverse side 2.5, of the packaging rim 2.2.

The guide 10 is formed by two belt conveyors 10.1, 10.2, extending mutually parallel and each provided with its own drive (motor) 10.3. The drives 10.3 rotate in opposite directions, in such a way that the mutually facing portions 10.4, 10.5 of the belts travel in the same direction, in the direction of the label 1 to be applied. The belt conveyors 10.1, 10.2 define the transport path for the packaging 2 to be labelled and thus form a driven lateral guide 10. The belts are preferably formed in a plurality of layers, and comprise, on the outside thereof which contacts the packaging, an entrainment layer 10.6, 10.7 which is made of flexible foam or a material having resilient restoration properties. For example, the entrainment layer 10.6, 10.7 is made of a foamed rubber layer, whilst the inner layer 10.8, 10.9, in a material fit therewith, consists of unfoamed, fabric-reinforced rubber or plastics material.

So as to be able to align and label packagings of different widths using the device, the belt conveyors 10.1, 10.2 may be displaced towards and away from one another, as is indicated by the two double-headed arrows 11, 12 in FIG. 2. The device can thus be used for packagings 2 which are transported in the direction of the longitudinal axis thereof and also for those which are transported in the direction of the transverse axis thereof. In the respectively set position, the belt conveyors 10.1, 10.2 are locked from unintentional displacement. Moreover, the position of the belt conveyors 10.1, 10.2 may also be adjusted vertically, in such a way that the height of the lateral guide 10 defined by said belt conveyors can be variably adjusted relative to the transport or support surface 13 carrying the packaging 2. The vertical adjustment option is indicated by the double-headed arrow 30 in FIG. 1. The height of the belt conveyors 10.1, 10.2 relative to the transport or support surface 13 is set as a function of the height of the packaging 2, in particular the height of the web-shaped protrusion 2.2.

Figure 3:
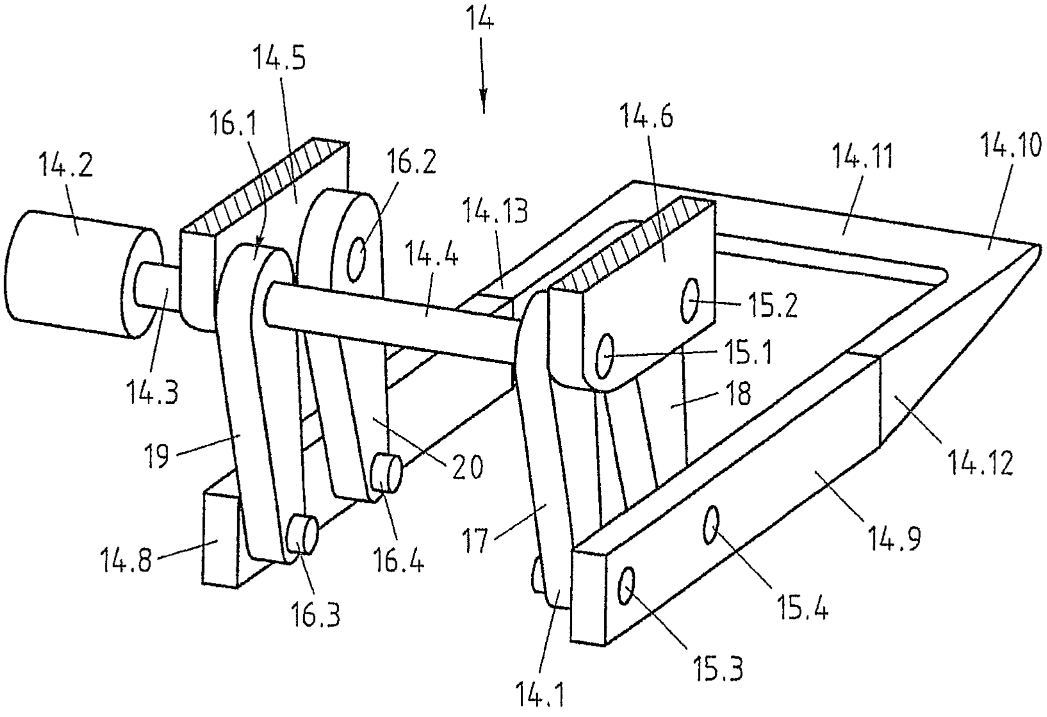
FIG. 3 is a perspective view of a pressing means mounted in the device according to FIGS. 1 and 2.

The device further comprises a pressing means 14 which smooths the label 1 onto the fillet 2.7 of the packaging 2. The pressing means 14 comprises a transmission 14.1 and a drive 14.2 which is coupled thereto. Preferably, the transmission 14.1 is in the form of a many-membered articulated transmission and is provided with an electric stepper motor 14.2, as can be seen most clearly in FIG. 3. However, instead of a stepper motor or electric motor drive 14.2, another suited drive may be used, in particular a pneumatic drive. The drive-shaft 14.3 of the stepper motor 14.2, which is fixed in place by a motor base (not shown), is coupled to a shaft 14.4 which is mounted rotatably in mountings 14.5, 14.6, which are arranged mutually parallel and are in turn rigidly connected to a base frame (not shown) of the device. Two pivot bearings 15.1, 15.2, 16.1, 16.2 are formed on each of the two mountings 14.5, 14.6, the axis of rotation of one pivot bearing 15.1, 15.2 being aligned with the axis of rotation of the opposing pivot bearing 16.1, 16.2 on the other mounting 14.6. Four hinge arms 17, 18, 19, 20, two (17, 19) of which are rotationally engaged with the shaft 14.4, are articulated to the pivot bearings 15.1, 15.2, 16.1, 16.2. The hinge arms 17, 18, 19, 20 comprise pivot bearings 15.3, 15.4, 16.3, 16.4 on the ends thereof remote from the mountings 14.5, 14.6, the axis of rotation of one pivot bearing 15.3, 15.4 in turn being flush with the axis of rotation of the opposing pivot bearing 16.3, 16.4. Two strip-shaped holders 14.8, 14.9 are articulated to the pivot bearings 15.3, 15.4, extend mutually parallel, and hold a C-shaped pressing body 14.10 on the ends thereof remote from the shaft 14.4. The transmission 14.1 guides the pressing body 14.10 parallel to the substantially planar transport or support surface 13, which carries the packaging 2.

The central portion 14.11 of the pressing body 14.10 is formed relatively flat with regard to the fixing ends 14.12, 14.13 connected to the holders 14.8, 14.9. The linear working edge 14.14 of the pressing body 14.10 is rounded and extends parallel to the plane in which the label 1 released from the carrier strip 4 is arranged for application on the packaging 2.

Figure 4:
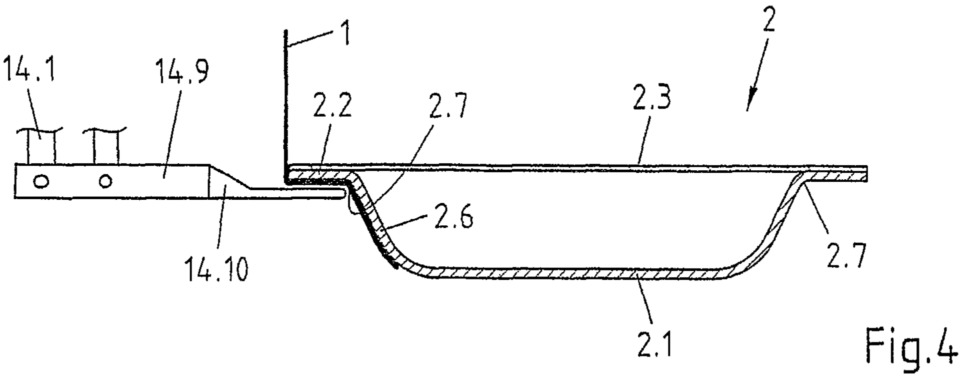
FIG. 4 is a longitudinal sectional view of a packaging having a peripheral rim which defines a fillet and having a label applied to the fillet.
Figure 5:
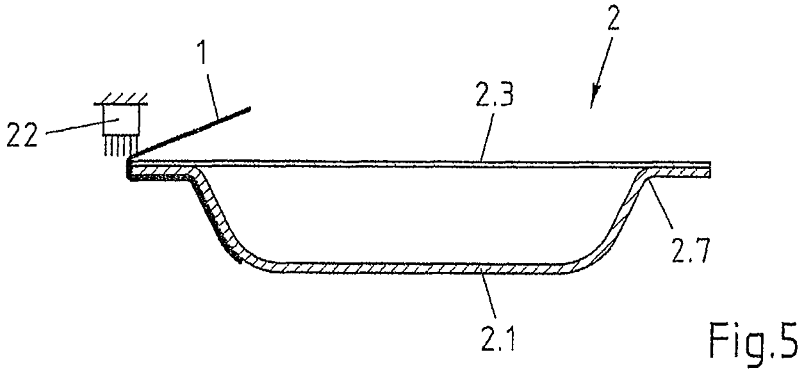
FIG. 5 shows the packaging according to FIG. 4 having an associated brush strip for turning or applying a projecting label portion on the upper side.

The pressing means 14, in particular the strip-shaped pressing body 14.10, is moved by the transmission 14.1 and the associated drive 14.2 from an initial or idle position to an operating position, the packaging 2 being unmoved or fixed by the conveyor belt 10.1, 10.2 and the label 1 being smoothed onto the fillet 2.7 of the packaging 2 by the movement of the pressing body 14.10 into the operating position, or the pressing body being arranged or fixed unmoved in the operating position and the label 1 being moved against the pressing body 14.10 by moving the packaging 2 by means of the belt conveyors 10.1, 10.2. In either case, the label 1 is applied to the fillet 2.7 so as to be positioned tightly thereon. FIG. 4 schematically shows the label 1 being pressed or smoothed onto the fillet 2.7 by the pressing body 14.10. Further, it is also within the scope of the invention to control the pressing means 14 and the conveyors 10.1, 10.2 in such a way that the label 1 is smoothed onto the fillet 2.7 of the packaging 2 by moving the pressing means 14 while the packaging 2 simultaneously moves onwards.

Subsequently, the pressing means 14 is returned to the initial or idle position thereof by the associated drive 14.2. The packaging 2 can subsequently be moved onwards below the pressing means 14. The label 1 is thus laid above the web-shaped rim 2.2 by a brush strip 22 or the like and spread or pressed onto the upper side of the cover foil 2.3 (see FIG. 5). The brush strip 22 is preferably mounted on a mechanism which can lower it into an operating position and raise it into an idle position, as is shown schematically in FIG. 1. Instead of a brush strip 22, a roller or a blowing means may for example also be used to lay the label 1 and press it onto the upper side of the cover foil 2.3. In the embodiment shown, the operating position of the brush strip 22 is the position in which the lower edge of the brush strip 22 is at the same height as or below the upper edge of the object 2 to be labelled.

An inclined sliding surface 23, via which the labelled packaging 2 is removed or guided onwards onto a conveyor (not shown), is arranged below the pressing means 14. Instead of the sliding surface 23, a belt conveyor or an inclined roller conveyor may also be arranged below the pressing means 14.

Figure 6:
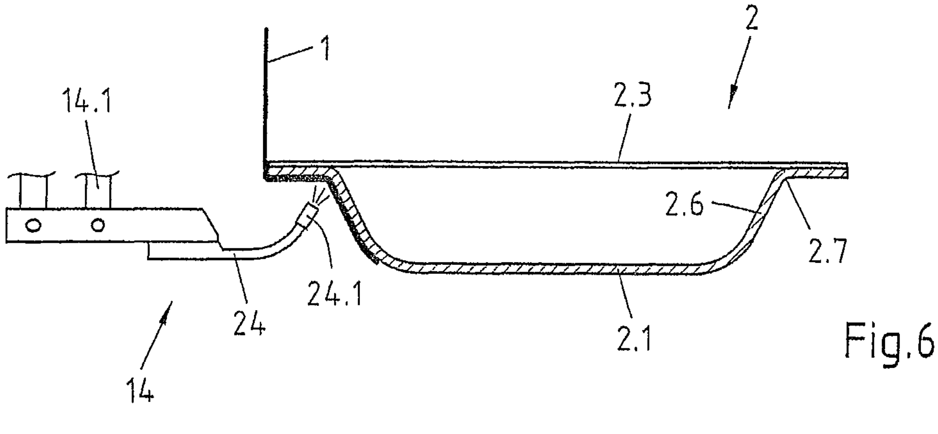
FIG. 6 is a longitudinal sectional view of a further embodiment of the device according to the invention, having a pressing means for smoothing a label onto a fillet of a packaging container in a contact-free manner.
Figure 7:
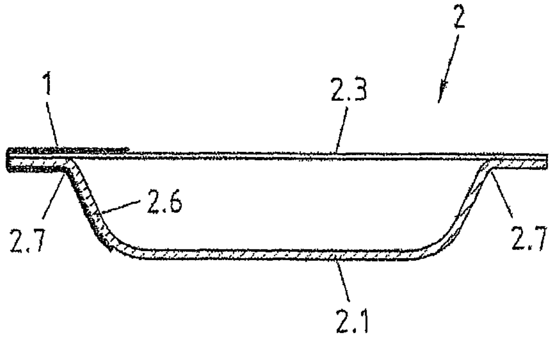
FIG. 7 is a longitudinal sectional view of the packaging according to FIGS. 4 to 6 with a label applied in accordance with the invention.

FIG. 6 shows schematically an embodiment in which the pressing means 14 applies the label 1 to the fillet 2.7 of the packaging 2 in a contact-free manner. For this purpose, the transmission 14.1 of the pressing means 14 is provided with at least one compressed air line 24 comprising one or more nozzles 24.1. In this case, the label 1 is smoothed onto the fillet 2.7 by compressed air jets.

Figure 8:
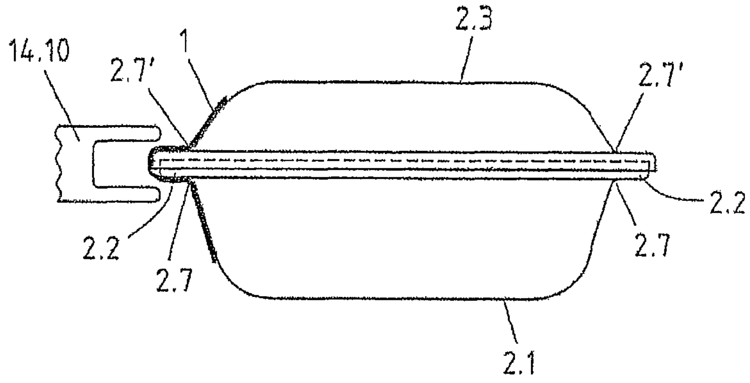
FIG. 8 is a side view of a packaging, consisting of a tray and a curved lid, with a label applied in accordance with the invention.
Figure 9:
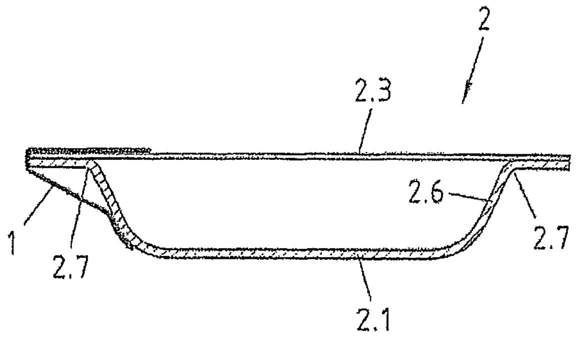
Fig.9 Prior art
FIG. 9 is a longitudinal sectional view of a packaging according to FIGS. 4 to 7 with a label applied in a conventional manner.

FIG. 8 shows a packaging 2 consisting of a tray 2.1 and a three-dimensionally shaped lid 2.3, the lid 2.3 being in a material or positive fit with the web-shaped rim (flange) 2.2 of the tray 2.1. The peripheral wall 2.6 of the tray 2.1 in turn forms a fillet 2.7 along with the web-shaped rim 2.2. The lid 2.3 likewise has a peripheral fillet 2.7'. Using a device according to the invention, a single label 1 was applied to the packaging 2 in such a way that the label 1 applied to the tray 2.1 and lid 2.3 is smoothed onto the fillets 2.7, 2.7'. For this purpose, the pressing body 14.10 of the device according to the invention preferably comprises a U-shaped or fork-shaped working edge, which surrounds the web-shaped edge 2.2 of the packing 2 while the label 1 is smoothed onto the fillets 2.7, 2.7'. Alternatively, the pressing body 14.10 may also be formed in two parts, so as to comprise a first part defining an upper working edge and a second part defining a lower working edge. It is further within the scope of the present invention to use a single pressing body 14.10 according to FIG. 3, which smooths the label 1 initially onto the lower fillet 2.7 and subsequently onto the upper fillet 2.7'—or vice versa—by means of an adapted transmission and a special control system.

The pressing means 14 according to the invention is preferably provided with at least one adjustment means (not shown), by means of which the engagement point of the pressing body 14.10 relative to the transport or support surface 13 carrying the packaging 2, and thus relative to the packaging 2, can be set. For this purpose, the adjustment means advantageously comprises an electric-motor-driven, pneumatic, hydraulic and/or piezoelectric drive (not shown). Alternatively or in addition, this drive may also consist or be formed of a hand crank drive and/or gravity drive.

As stated, the device according to the invention comprises various drives for the label introduction means, the conveyors 7, 10.1, 10.2, the pressing means 14, the positioning means for positioning the conveyors 10.1, 10.2 and/or the brush strip 22, and optionally the adjustment means associated with the pressing means 14. A control means 25 is provided for controlling said drives. Sensors, preferably optical sensors for detecting the positions of the packaging 2, the label 1 to be applied, the pressing body 14.10 and/or the conveyors 10.1, 10.2, are connected to the control means 25. The control means 25 is further provided with a data input means and/or a data interface, via which data regarding the dimensions and/or constitution of the packaging 2 to be labelled, in particular the position of the web-shaped rim 2.2, and/or data regarding the constitution of the label 1 to be applied can be inputted into a data storage unit. The control means 25 controls said drives as a function of the inputted data and the values or positions detected via the sensors. In this way, in particular the position of the label 1 and the strength of the contact of the pressing body 14.10 can be controlled and monitored by a corresponding software, and this is advantageous for example in relation to soft or sensitive packagings. Alternatively, all of the drives may be brought into the required positions by hand.

The execution of the invention is not limited to the above-described embodiments. Rather, a number of variants are possible, and, in spite of the differing configuration thereof, still make use of the invention specified in the appended claims. Thus, the device may for example also be equipped with a label introduction means which introduces the label 1 to be applied to the applicator means from above in relation to the transport path of the object 1 to be labelled. The pressing means 14 according to the invention can thus be used for labels 1 dispensed from below and also for those dispensed from above.

Also, other continuous conveyors, in particular roller conveyors having driven rollers or chain conveyors having dogs for the respective packaging types, may be provided in the device according to the invention instead of the belt conveyors 10.1, 10.2.

Further, a plurality of pressing means 14 of the disclosed type may also be used to smooth a single label 1, for example a pasted label, or a plurality of labels onto a single fillet 2.7 or a plurality of fillets of the object to be labelled. In this case the pressing means may in particular engage on opposite sides of the object 2 so as to smooth the at least one label 1 onto a peripheral fillet 2.7 of the object 2 to be labelled.

In principle, the device according to the invention is also adapted for two-sided or multi-sided labelling of packagings comprising a round, in particular circular, oval or triangular tray having a rim defining a fillet.

The invention claimed is:

1. A device for two-sided or multi-sided application of at least one self-adhesive label to a three-dimensional object, which has a protrusion defining a lower fillet, comprising:

a transport or support surface supporting the object to be labelled, a conveyor for transporting the object to be labelled, at least one applicator means, by means of which the label can be applied to the protrusion of the object, at least one pressing means, comprising a pressing body, for smoothing the label onto the object, and a control means, wherein the pressing body can be moved back and forth from an initial position, which is vertically spaced from the transport or support surface and located above the transport or support surface, to an operating position, in which the pressing body reaches under the protrusion of the labelled object defining the lower fillet and is arranged at least in part below said protrusion, the pressing body configured to be moved back and forth from the initial position to the operating position by means of a single drive, wherein, after the pressing means is moved back to its initial position by the associated drive, the labelled object is moved through beneath the pressing means, wherein the label is smoothed onto the lower fillet of the object, wherein the pressing body is mounted on a many-membered articulated transmission, which is coupled to the single drive, and wherein by means of the control means, the drive, which moves the pressing means, and the conveyor for transporting the object to be labelled can be controlled in such a way that the conveyor fixes the object in an application position and the pressing body is moved against the object to smooth the label onto the lower fillet of the object.

2. The device according to claim 1, wherein the pressing body contacts the object to be labelled while the label is smoothed on, the transmission guiding the pressing body in the movement from the initial position to the operating position and back, orientated parallel to a substantially planar transport or support surface which carries the object to be labelled.

3. The device according to claim 1, wherein the pressing body contacts the object to be labelled while the label is smoothed on, the transmission guiding the pressing body along a curved, in particular arced path in the movement from the initial position to the operating position and back.

4. The device according to claim 1, wherein the pressing means is provided with at least one adjustment means, with which an engagement point thereof on the object to be labelled can be adjusted relative to said object and to the transport or support surface.

5. The device according to claim 1, wherein the pressing means is equipped with various mutually exchangeable pressing bodies, of which the respective pressing body in the mounted state contacts the object to be labelled while the label is smoothed on, and is provided with various mutually exchangeable transmission elements.

6. The device according to claim 1, further comprising at least one alignment means having at least one guide which aligns an elongate protrusion, defining the fillet, of the object to be labelled parallel to an elongate working edge of the pressing body.

7. The device according to claim 6, wherein the guide is formed from conveyors, which are provided with at least one drive.

8. The device according to claim 7, wherein the height of the guide or the conveyor is adjustable relative to the transport or support surface.

9. The device according to claim 7, wherein the conveyors are continuous conveyors.

10. The device according to claim 6, wherein the alignment means comprises at least two belt conveyors, which extend mutually parallel, define a transport path for the object to be labelled, and can be displaced towards and away from one another.

11. The device according to claim 10, wherein at least one of the belt conveyers comprises at least one belt comprising a plurality of layers, and an entrainment layer, which is made of flexible foam or a material having resilient restoration properties and faces towards the transport path.

12. The device according to claim 1, further comprising a label introduction means which introduces the label to the applicator means from above or below in relation to a transport path of the object to be labelled.

13. The device according to claim 1, further comprising at least two pressing means of the specified type, with which the label or a plurality of labels can be smoothed onto the fillet or a plurality of these fillets of the object to be labelled.

14. The device according to claim 13, wherein the pressing means for smoothing the at least one label onto the at least one fillet engage on opposite sides of the object.

15. The device according to claim 1, wherein by means of the control means, the drive, which moves the pressing means, and the conveyor for transporting the object to be labelled can be controlled in such a way that the conveyor moves the object along an application region and the pressing body for smoothing the label onto the fillet of the object moved along the application region is moved against the object, in such a way that the label is smoothed onto the fillet while the object is moving and while the pressing means is moving.

16. The device according to claim 1, wherein the control means is provided with a data input means or a data interface, via which data regarding the dimensions or constitution of the object to be labelled, in particular, the position of the protrusion, or data regarding the constitution of the label to be applied can be inputted into a data storage unit, and wherein the control means controls the pressing means or the conveyor, in particular, the drive thereof or an adjustment means thereof, as a function of the inputted data.

17. A device for two-sided or multi-sided application of at least one self-adhesive label to a three-dimensional object, which has a protrusion defining a lower fillet, comprising:

a transport or support surface supporting the object to be labelled, at least one applicator means, by means of which the label can be applied to the protrusion of the object, and at least one pressing means, comprising a compressed air nozzle, for smoothing the label onto the object, wherein the compressed air nozzle can be moved back and forth from an initial position, which is vertically spaced from the transport or support surface and located above the transport or support surface, to an operating position, in which the compressed air nozzle reaches under the protrusion of the labelled object defining the lower fillet and is arranged at least in part below said protrusion, the compressed air nozzle configured to be moved back and forth from the initial position to the operating position by means of a single drive, wherein, after the pressing means is moved back to its initial position by the associated drive, the labelled object is moved through beneath the pressing means, wherein the label is smoothed onto the lower fillet of the object, and wherein the compressed air nozzle is mounted on a many-membered articulated transmission, which is coupled to the single drive.

* * * * *